United States Patent
Arunkumar et al.

(10) Patent No.: US 10,069,829 B1
(45) Date of Patent: *Sep. 4, 2018

(54) MULTI-PARTY SECURE GLOBAL ATTESTATION

(71) Applicant: International Business Machines Corporation, Armonk, NY (US)

(72) Inventors: Saritha Arunkumar, Basingstoke (GB); Diyanesh B. Chinnakkonda Vidyapoornachary, Bangalore (IN); Douglas J. Cowie, Bishopstoke (GB); Saravanan Sethuraman, Bangalore (IN)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 15/718,439

(22) Filed: Sep. 28, 2017

Related U.S. Application Data

(63) Continuation of application No. 15/597,637, filed on May 17, 2017.

(51) Int. Cl.
H04L 29/06 (2006.01)
H04L 9/08 (2006.01)
H04L 9/14 (2006.01)

(52) U.S. Cl.
CPC ........ *H04L 63/0884* (2013.01); *H04L 9/0822* (2013.01); *H04L 9/0869* (2013.01);
(Continued)

(58) Field of Classification Search
CPC .................................................. H04L 63/0884
(Continued)

(56) References Cited

U.S. PATENT DOCUMENTS 8,327,441 B2 12/2012 Kumar et al.
9,077,543 B2 7/2015 Luft et al.
(Continued)

FOREIGN PATENT DOCUMENTS

WO 2016137307 A1 9/2016

OTHER PUBLICATIONS

Jansen et al., "Proximity-based Authentication for Mobile Devices", Proceedings of the 2005 International Conference on Security and Management, Jun. 20, 2005. 7 pages.
(Continued)

*Primary Examiner* — Jacob Lipman
(74) *Attorney, Agent, or Firm* — Michael Purdham

(57) ABSTRACT

In authentication in global attestation, a server receives a request for access to a location based service. The server establishes a connection with a first device and with a second device, wherein the devices are connected by a location bounded network. The server sends a key order information to the first device and a first plurality of keys to the second device. The server receives a second plurality of keys from the first device, wherein the second plurality of keys is an ordered set of keys compiled using the key order information and the first plurality of keys. The server determines that the second plurality of keys received from the first device matches an expected plurality of keys. The server outputs, to the location based service, a notification indicating a result of the determining that the second plurality of keys matches the expected plurality of keys.

1 Claim, 4 Drawing Sheets

(52) U.S. Cl.
CPC .............. *H04L 9/14* (2013.01); *H04L 63/061* (2013.01); *H04L 63/10* (2013.01)

(58) Field of Classification Search
USPC ......................................................... 713/171
See application file for complete search history.

(56) References Cited

U.S. PATENT DOCUMENTS

| | | | |
|---|---|---|---|
| 9,092,616 B2 | 7/2015 | Kumar et al. | |
| 9,189,645 B2 | 11/2015 | Borzycki et al. | |
| 9,398,050 B2 | 7/2016 | Islam et al. | |
| 2008/0098464 A1* | 4/2008 | Mizrah | G06F 21/36 726/5 |
| 2008/0127031 A1* | 5/2008 | Olsson | G03F 7/70283 716/54 |
| 2013/0191902 A1* | 7/2013 | Friedl | H04L 9/3271 726/7 |
| 2014/0122873 A1 | 5/2014 | Deutsch et al. | |
| 2015/0302571 A1 | 10/2015 | Lambert | |

OTHER PUBLICATIONS

Kim et al., "Secure user authentication based on the trusted platform for mobile devices", EURASIP Journal on Wireless Communications and Networking (2016) 2016:233. DOI 10.1186/S13638-016-0729-7. 15 pages.

Arunkumar et al., "Ensuring the Credibility of Devices for Global Attestation", U.S. Appl. No. 15/288,757, filed Oct. 7, 2016.

Arunkumar et al., "Global Attestation Procedure", U.S. Appl. No. 15/268,897, filed Sep. 19, 2016.

Arunkumar et al., "Multi-Party Secure Global Attestation", U.S. Appl. No. 15/597,637, filed May 17, 2017.

IBM, List of IBM Patents or Patent Applications Treated as Related, Sep. 28, 2017, 2 pages.

* cited by examiner

MULTI-PARTY SECURE GLOBAL ATTESTATION

BACKGROUND

The present disclosure generally relates to device authentication, and more specifically, to techniques for validating the location of devices through global attestation.

In many situations, applications and services can use information about a user's location to provide appropriate information and other application related content to the user. Given that the location information from the user's device can play a part in many location based transactions, location based services typically attempt to verify that the user is attempting to access the location based service from a correct location before completing any location based transactions. That is, location based services generally attempt to verify that the location information (e.g., global positioning system (GPS) coordinates) received from the user's device corresponds to the device's actual geo-location.

SUMMARY

Disclosed herein are embodiments of a method and computer program product for authentication in global attestation. A server receives a request for access to a location based service. The server establishes a connection with a first device and the server establishes a connection with a second device, wherein the first device is connected to the second device by a location bounded network. The server sends a key order information to the first device. The server sends a first plurality of keys to the second device. The server receives a second plurality of keys from the first device, wherein the second plurality of keys is an ordered set of keys compiled using the key order information sent to the first device and the first plurality of keys sent to the second device. The server determines that the second plurality of keys received from the first device matches an expected plurality of keys. The server outputs, to the location based service, a notification indicating a result of the determining that the second plurality of keys matches the expected plurality of keys.

Also disclosed herein are embodiments of a system for authentication in global attestation. The system includes one or more processors and a memory communicatively coupled to the one or more processors, wherein the memory comprises instructions which for execution by the one or more processors. The processor(s) receive a request for access to a location based service. The processor(s) establish a connection with a first device and the processor(s) establish a connection with a second device, wherein the first device is connected to the second device by a location bounded network. The processor(s) send a key order information to the first device. The processor(s) send a first plurality of keys to the second device. The processor(s) receive a second plurality of keys from the first device, wherein the second plurality of keys is an ordered set of keys compiled using the key order information sent to the first device and the first plurality of keys sent to the second device. The processor(s) determine that the second plurality of keys received from the first device matches an expected plurality of keys. The processor(s) output to the location based service, a notification indicating a result of the determining that the second plurality of keys matches the expected plurality of keys.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
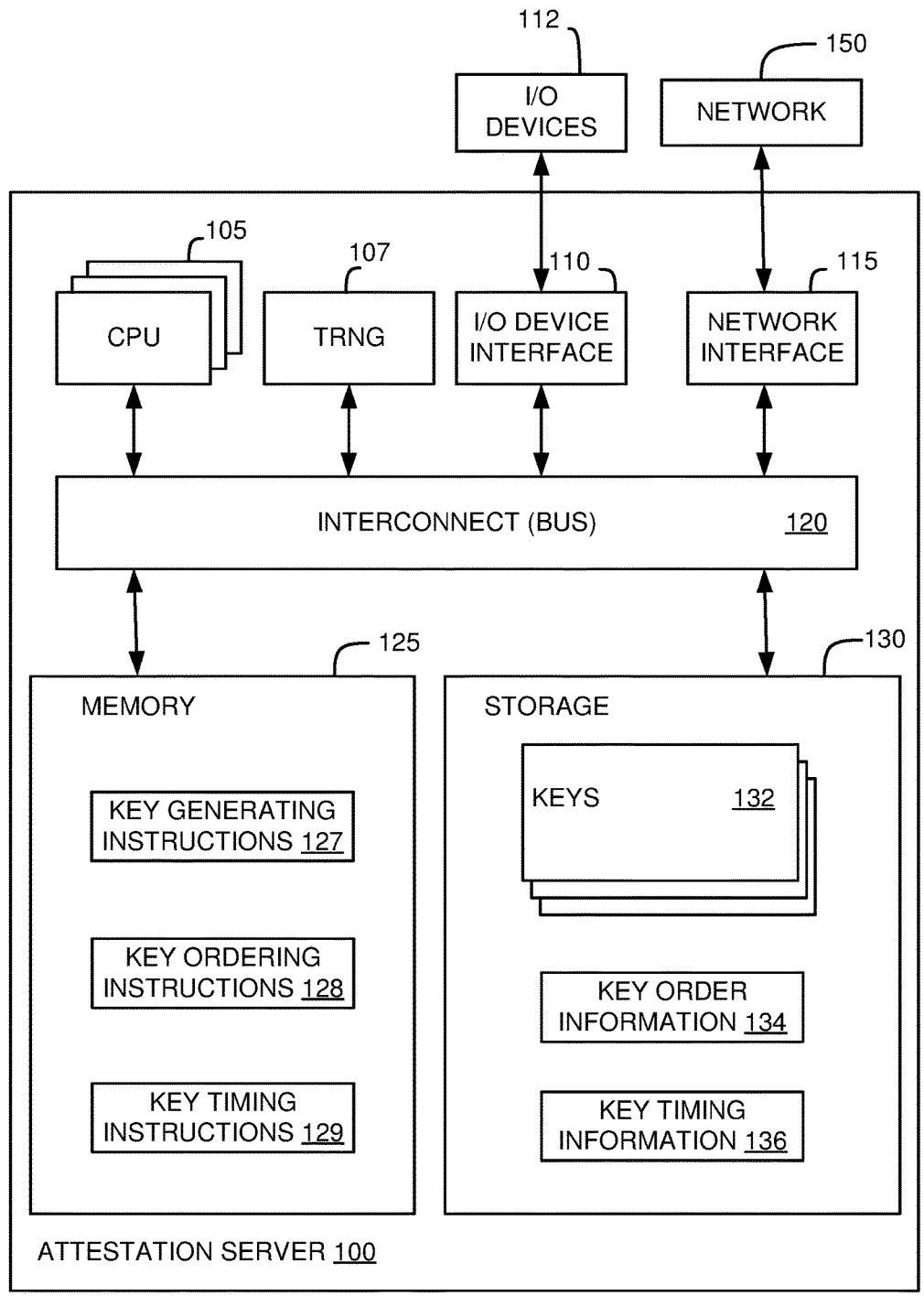
FIG. 1 illustrates a block diagram of an attestation server, in accordance with some embodiments of the present disclosure.

While the present disclosure is amenable to various modifications and alternative forms, specifics thereof have been shown by way of example in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

Aspects of the present disclosure relate to device authentication, and more particular aspects relate to techniques for validating the location of mobile devices through global attestation. While the present disclosure is not necessarily limited to such applications, various aspects of the disclosure can be appreciated through a discussion of various examples using this context. Aspects of the present disclosure can also be used on any other computer systems when verification of their location may be requested including, but not limited to, personal computers, Internet of Things (IoT) devices, mainframes, servers, and/or devices in cloud computing environments.

In many situations, applications and services can use information about a user's location to provide appropriate information and other application related content to the user. Throughout this disclosure, these will be referred to as location based services, but may take the form of a service, an application, or some other form. Some examples of location based services include services that allow users to transmit a "check-in" at various locations (e.g., restaurants, coffee shops, stores, concerts, and other places or events), mapping and navigation applications, applications that offer incentives and discounts based on users' locations, etc.

Location based services can use a variety of different mechanisms to attest the location information received from a user. Local attestation, for example, is one such mechanism in which a location based service uses an access point, to which a device requesting access to the location based service is connected, to attest the requesting device's location information. In some cases, however, devices can collude with each other in order to circumvent the local attestation procedure and misrepresent the true location of a device attempting to access the location based service. Accordingly, location based services can use global attestation as a mechanism to prevent such collusion attempts.

In global attestation, which is based in part on local attestation, the location based service can use additional information including the contextual information of the requesting device (e.g., type of previous requests, locations associated with previous requests, etc.) and/or location reports (of the requesting device) received from nearby devices in proximity to the requesting device in order to attest the requesting device's location information. Still, global attestation can be susceptible to malicious actors that may attempt to gain unauthorized access to a location based service (e.g., by misrepresenting or faking the location information that is submitted to the location based service).

A location based service or application can use an attestation procedure (e.g., global attestation) to authenticate a device requesting access to (or content from) the location based service. In such a procedure, the location based service attests the location information received from the requesting device by validating credentials (e.g., GPS coordinates, identification information of nearby devices, etc.) from devices surrounding the requesting device (referred to herein as broker devices). A location based service can maintain a list of broker devices that can be used for authenticating requesting devices. During the attestation procedure, the location based service can broadcast requests to one or more (or all) broker devices and can process responses from any of the broker devices. Such broker devices, for example, may be connected to the same access point as the requesting device.

For example, if a device A requests to access a location based service via an access point, device A may send its location information along with identification information of other devices B and C, which may be in proximity to device A, to the location based service. Alternatively, the location based service may identify devices B and C on its own or have stored information for these devices. Once received, the location based service can request location information from each of devices B and C and identification information of any devices in proximity to devices B and C. The location based service can cross-check the received location and identification information received from each device in order to determine if device A's location information is accurate.

In the conventional attestation procedure, it is possible for malicious actors to identify and gain control over the broker devices (e.g., by listening to network traffic, identifying the broker devices receiving the most traffic, and performing a targeted attack on the broker devices), which the malicious actors, in turn, can use to grant one or more devices unauthorized access to a location based service. For example, a malicious actor can identify a device (e.g., device X) that they want to compromise and begin monitoring network traffic between device X and the location based service (e.g., such as tracking a request from device X to the location based service for user authentication). When the location based service begins to perform the attestation procedure for device X, the malicious actor can monitor the location based service's request to a set of n broker devices ($B_1, B_2, \ldots B_n$), and track responses from the n broker devices to determine the number of m broker devices ($B_1, \ldots B_m$) out of the set of n broker devices that responded (e.g., where m<n). At the same time, the malicious actor can record the credentials sent by each m device. The malicious actor, in turn, can track the location based service's response to device X to confirm that the service processed information from the m broker devices. For example, the malicious actor can confirm by monitoring for an acknowledgement (ACK) or negative ACK (NACK) transmitted from the service to device X. If the malicious actor does not detect a response from the service, it may mean that the acknowledgement for authentication was not sent.

Once the malicious actor identifies a set of brokers used for the attestation procedure, the malicious actor can perform a targeted attack in order to compromise the attestation procedure. For example, the malicious actor can generate a false (or fake) request to mimic a device with credentials, such as username/password, etc. (assuming they have already been compromised), and monitor for the service's request to the m broker devices for their credential information. Once requested, the malicious actor can generate the previously recorded credentials of each broker device ($B_1, \ldots, B_m$) and return the generated credentials to the location service in order to gain authentication for the unauthorized device.

The present disclosure provides ways to improve security of global attestation procedures. Embodiments presented herein provide for three-party communications between an attestation server (which can be operated or utilized by a location based service or application), a device requesting access to (or content from) the location based service, and a broker device. The device requesting access and the broker device can communicate through a location bounded network such as Bluetooth or a local area network (LAN), and can communicate with the attestation server over a broader network. Once a connection is established between the attestation server and the device requesting access, the attestation server sends separate information to each of the device requesting access and the broker device. One of these devices (in some embodiments it will be the device requesting access and in others it will be the broker device) receives a set of N keys (where N is the number of keys and can vary depending upon security needs) and the other device receives information indicating the order in which the attestation server expects to receive the keys back. The device with the key order information then obtains the keys from the other device and submits them in a systematic order to the attestation server. Upon receipt and verification of all of the keys in the proper order, the attestation server can authenticate the device and can allow access to (or content from) the location based service.

Thus, aspects of the present disclosure improve attestation procedure security by mitigating malicious attacks as previously described (e.g., the malicious actor's method described above of transmitting previously recorded credentials will not work unless the attestation server sends the same N keys and same key order information). Additionally, aspects of the present disclosure make the device requesting access an active part of the protocol, thereby further mitigating against the use of dummy nodes used to spoof a location (e.g., the device cannot be a dumb copy simply broadcasting location details).

In some embodiments, an attestation server may employ additional techniques to improve security. These techniques can include adding a timing element to the keys, such that the attestation server must receive each key by a specified time or in a specified time window in order for it to recognize the key as valid. This could prevent malicious actors from employing man-in-the-middle attacks, which add latency as data is communicated through an additional device. Additionally, an attestation server may encrypt the information it sends to the device requesting access and/or broker device using a session key, and only allow for one of the devices to decrypt the keys and key order information.

In some embodiments, an attestation server may require broker devices to authenticate with other broker devices using this same procedure, where a new broker device acts as a device requesting access and is authenticated with the assistance of another broker device. An attestation server may require that a device requesting access perform the procedure disclosed herein with more than one authenticated broker, either using the same keys and key order information, different sets of keys and key order information, or with portions of the keys or key order information being transmitted to different brokers to be combined for one authentication. The use of multiple broker devices can protect against individual rogue or compromised broker devices that are not in the location they claim to be.

These enhancements to global attestation may be utilized through backend procedures such that the user is unaware of the transmission of keys, key order information, and/or key timing information. Alternatively, a user may be notified of the progress of the global attestation in as much or as little detail as appropriate in various embodiments (e.g., through computer generated notifications, computer generated reports).

The aforementioned improvements and/or advantages are example improvements and/or advantages. These improvements and/or advantages are a non-exhaustive list of example advantages. Embodiments of the present disclosure exist which can contain none, some, or all of the aforementioned advantages and/or improvements.

Referring now to FIG. 1, illustrated is a block diagram of an attestation server 100, in accordance with some embodiments of the present disclosure. In some embodiments, attestation server 100 performs operations in accordance with FIG. 4 as described in further detail hereinafter. The attestation server 100 can include one or more processors 105 (also referred to herein as CPUs 105), a true random number generator 107 (TRNG, also known as a hardware random number generator), an I/O device interface 110 which can be coupled to one or more I/O devices 112, a network interface 115, an interconnect (e.g., BUS) 120, a memory 125, and a storage 130.

In some embodiments, each CPU 105 can retrieve and execute programming instructions stored in the memory 125 or storage 130. The interconnect 120 can be used to move data, such as programming instructions, between the CPUs 105, I/O device interface 110, network interface 115, memory 125, and storage 130. The interconnect 120 can be implemented using one or more busses. Memory 125 is generally included to be representative of a random access memory (e.g., static random access memory (SRAM), dynamic random access memory (DRAM), or Flash).

In some embodiments, the memory 125 can be in the form of modules (e.g., dual in-line memory modules). The storage 130 is generally included to be representative of a non-volatile memory, such as a hard disk drive, solid state device (SSD), removable memory cards, optical storage, or flash memory devices. In an alternative embodiment, the storage 130 can be replaced by storage area-network (SAN) devices, the cloud, or other devices connected to the attestation server 100 via the I/O devices 112 or a network 150 via the network interface 115.

The CPUs 105 can be a single CPU, multiple CPUs, a single CPU having multiple processing cores, or multiple CPUs with one or more of them having multiple processing cores in various embodiments. In some embodiments, a processor 105 can be a digital signal processor (DSP). The CPUs 105 can additionally include one or more memory buffers or caches (not depicted) that provide temporary storage of instructions and data for the CPUs 105. The CPUs 105 can be comprised of one or more circuits configured to perform one or more methods consistent with embodiments of the present disclosure.

The TRNG 107 is not required in all embodiments, but may be employed for use by the attestation server 100 in generating keys, key orders, and/or key timing information. The TRNG 107 is a device that generates random numbers from a physical process, rather than a computer program. The TRNG 107 can be based on microscopic phenomena that generate low-level, statistically random "noise" signals, some aspect of the microscopic phenomena can be converted to an electrical signal, and the output can be converted to a digital number. The TRNG 107 can generate a series of random numbers by repeated sampling of the varying signal. In other embodiments, the TRNG 107 can be replaced by software random number generation, such as a pseudorandom number generator, or other techniques for generation of random numbers.

The memory 125 of attestation server 100 includes key generating instructions 127, key ordering instructions 128, and key timing instructions 129. Key generating instructions 127 can be processor-executable instructions for generating the keys to be sent to the devices. Key generating instructions 127 can use input from the TRNG 107 or other source of random numbers in generating keys. Key generating instructions 127 can also generate a set of keys from an existing list or database of keys.

Key ordering instructions 128 can be processor-executable instructions for selecting two or more keys and can determine the order in which the two or more keys should be received by attestation server 100. In some embodiments, key ordering instructions 128 can generate an order in which the keys are sent to the device receiving the keys from attestation server 100. In many cases, these orders will be different, but it is possible in some instances they may be equivalent. In some embodiments, if equivalent orders are generated, the process can be repeated until distinct orders are generated.

Figure 3:
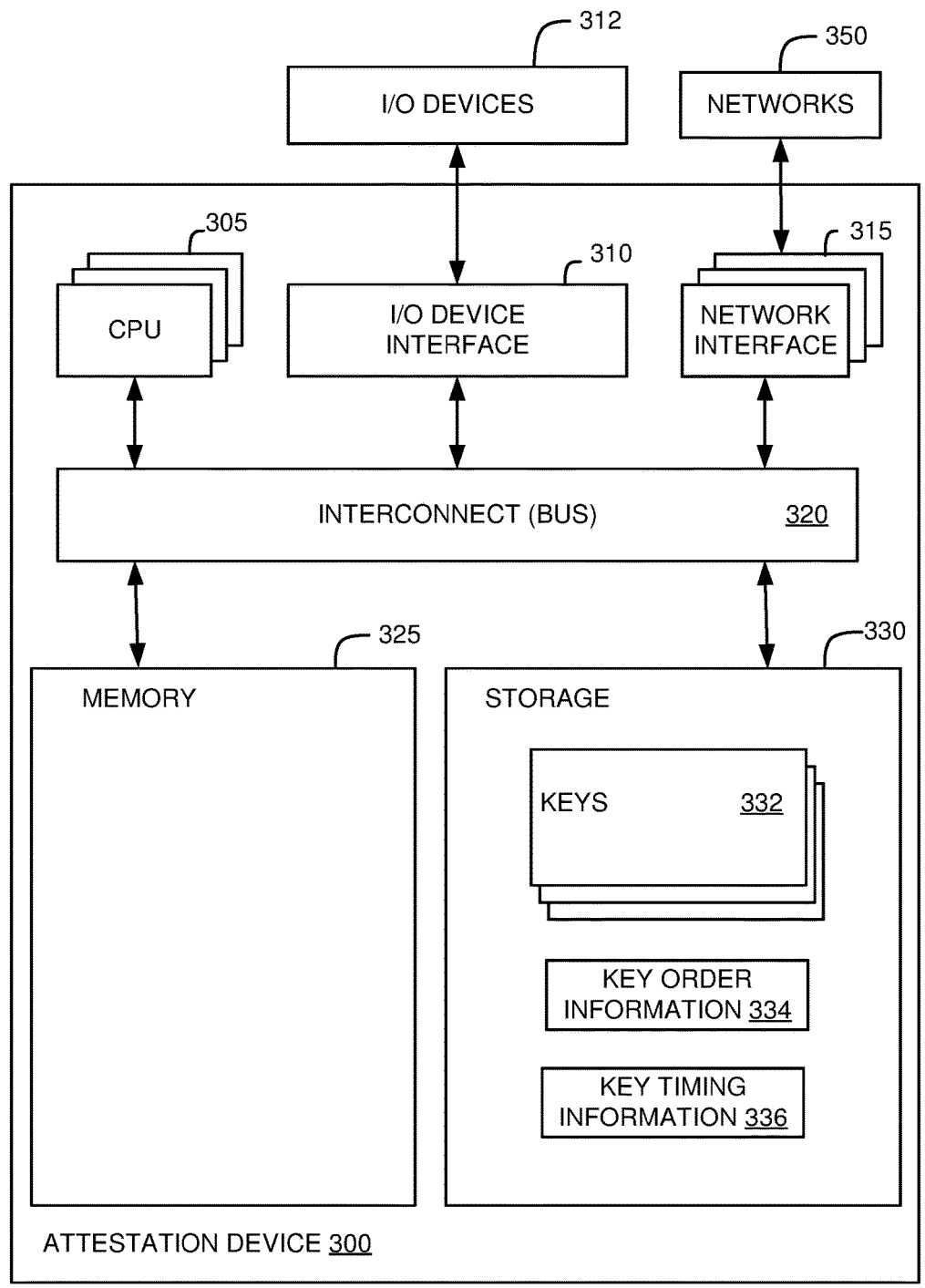
FIG. 3 depicts a block diagram of an attestation device, in accordance with some embodiments of the present disclosure.

Key ordering instructions 128 can use input from the TRNG 107 or another source of random numbers to order the keys. In some embodiments, input information from one of the devices involved can be used (after transmission to attestation server 100 if not created by the server) to determine a signature pattern, and key ordering instructions 128 can use this signature pattern along with a bias vector to generate the key orders. This input information can include, but is not limited to, an input sequence from physical or virtual keys (e.g. "m", "p", "3"), the timing of keystrokes, timing of mouse movements, timing of finger movements on a touchpad, fluctuation of Wi-Fi signals, fluctuation of motion sensors, and/or fluctuation of GPS information. In embodiments where the input comprises a sequence from physical or virtual keys or timing of keystrokes, these keys and keystrokes can refer to those such as on a keyboard, not the keys used for this attestation process (including keys 132 or keys 332 as depicted in FIG. 3, discussed further below). The bias vector can include, but is not limited to, a random number from TRNG 107 (or other source), the length of one or more of the keys, the key range in values, and/or information derived from the timing information for keys.

Key timing instructions 129 can be processor-executable instructions for determining information regarding the time that attestation server 100 should receive the keys or, in some embodiments, the time the device sending the keys should send them. Key timing instructions 129 may generate key timing information 136 according to procedures specified by attestation server 100 or may generate random times using any of the methods described above including random number generation, signature patterns, and bias vectors. Key timing instructions 129 and key timing information 136 could utilize timestamps relating to the keys, including MAC timestamps (modification time, access time, or change time). For example, key timing instructions 129 may generate key timing information that provides for receipt or sending of keys at a time relative to the MAC timestamp, such as, for example, that a key must be sent within 10 seconds of its last modification.

Storage 130 contains keys 132, key order information 134, and key timing information 136. Keys 132 can be the keys generated using key generating instructions 127 discussed above. Because the role of the keys in this process is their transmission between three or more devices and not for use as cryptographic keys, keys 132 may take many forms including strings of numbers, letters, symbols, phrases, pictures, any combination of the aforementioned forms, and/or any other information that can be transmitted between the devices involved and returned to attestation server 100 unchanged. Keys 132 may be stored in storage 130 for temporary use or added to a database or list for future use as well.

Key order information 134 is the information about the order of the keys to be returned to attestation server 100. In some embodiments, key order information 134 will take the form of a listing of identifiers of keys in the order to be received. For example, key order information 134 could be key number 3, key number 20, key number 14, and key number 8, where the keys are marked with numbers and this listing is the order in which they are to be received. The identifiers of keys could also correspond to a portion of each key. For example, key order information 134 could be the key containing fe4w2r4, the key containing #29df-w, the key containing ds0t9dt, etc. In such a system, these identifiers would be selected such that no two keys contain the same portion used to identify a given key.

In other embodiments, key order information 134 could consist of information about the first key (or could be the first key itself) to be received by attestation server 100, where the first key also contains within it (or has attached to it) identifying information of the second key to be received. In these embodiments, the other keys to be received by attestation server 100 should each contain identifying information of the key which should be received next. The last key in these embodiments may contain no such identifying information, contain identifying information for the first key, or contain identifying information which does not correspond to any actual key. The device receiving the key order information can receive appropriate instructions regarding the contents of the last key, such that the last key can be appropriately recognized. In some embodiments, such instructions could be part of key order information 134 in the form of information about which key is the last key, or key order information 134 can additionally consist of the last key to be received. Similarly, key order information 134 can additionally consist of information about the order of other keys, or consist of other subsets of the keys. For example, in some embodiments, key order information 134 could consist of the first, third, sixth, and last keys (or information about those keys). In such embodiments, only some of the keys could contain information of which key should be received next. Continuing with this example, the second, fifth, and next-to-last keys would not need to have information about which key to send next, because that information is within key order information 134. Other variations of what key order information 134 contains can exist and the present disclosure should not be read as limited to the example embodiments presented herein.

Key timing information 136 can be generated by the key timing instructions 129. Key timing information 136 can take the form of time deadlines that the sending or receiving of each key must occur by, earliest times the sending or receiving of each key can occur, time windows combining earliest and latest times for sending and receiving each key, or precise times (with or without any margin for error) that the sending or receiving of each key must occur at. Additionally, the times may be expressed in absolute or relative terms. For example, the time for the second key may be expressed as needing to be received by 9:01:25 a.m., or in terms of how long after the first key is sent or received, such as no more than 2.3 seconds after the first key is sent or received. In some embodiments, key timing information 136 can exist separately from keys 132 as shown. In other embodiments, each key can include information regarding its timing, such that separate key timing information 136 is not used.

In some embodiments as discussed above, the memory 125 stores key generating instructions 127, key ordering instructions 128, and key timing instructions 129, and the storage 130 stores keys 132, key order information 134, and key timing information 136. However, in various embodiments, each of the key generating instructions 127, key ordering instructions 128, key timing instructions 129, keys 132, key order information 134, and key timing information 136 are stored partially in memory 125 and partially in storage 130, or they are stored entirely in memory 125 or entirely in storage 130, or they are accessed over a network 150 via the network interface 115.

In various embodiments, the I/O devices 112 can include an interface capable of presenting information and receiving input. For example, I/O devices 112 can receive input from a user and present information to a user and/or a device interacting with attestation server 100.

Figure 2:
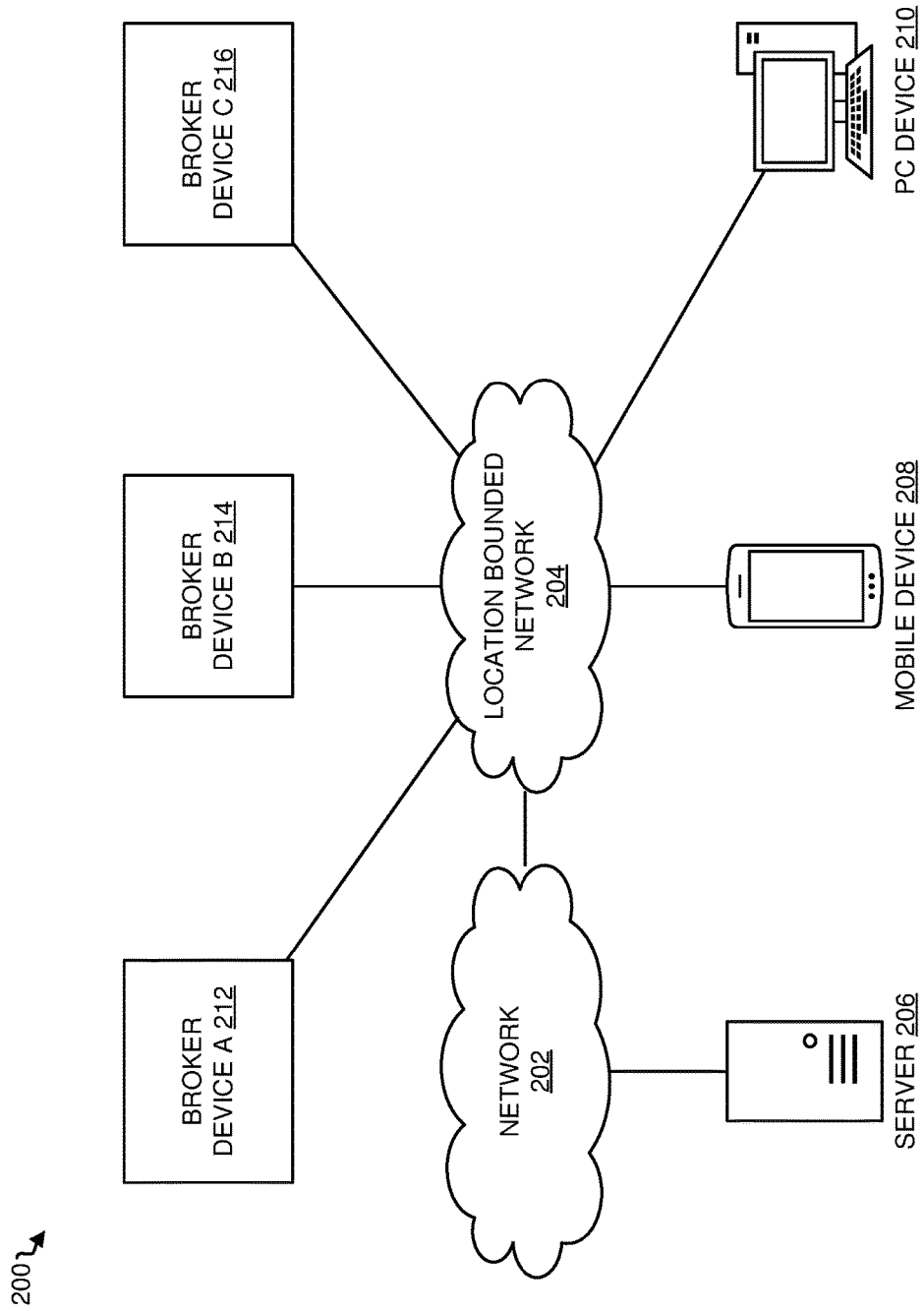
FIG. 2 illustrates a block diagram of a system in which some embodiments of the present disclosure can be implemented.

In some embodiments, the network 150 is consistent with network 202 as described with respect to FIG. 2. The network 150 can connect (via a physical or wireless connection) the attestation server 100 with other networks, and/or one or more devices (e.g., mobile device 208, PC device 210, broker devices A-C 212-216 of FIG. 2) that interact with the attestation server.

Logic modules throughout the attestation server 100—including but not limited to the memory 125, the CPUs 105, and the I/O device interface 110—can communicate failures and changes to one or more components to a hypervisor or operating system (not depicted). The hypervisor or the operating system can allocate the various resources available in the attestation server 100 and track the location of data in memory 125 and of processes assigned to various CPUs 105. In embodiments that combine or rearrange elements, aspects and capabilities of the logic modules can be combined or redistributed. These variations would be apparent to one skilled in the art.

FIG. 2 illustrates a block diagram of system 200 in which some embodiments of the present disclosure can be implemented. Network 202 communicatively couples server 206 to location bounded network 204 via a physical or wireless connection. Network 202 can be as large as the internet, or may be a smaller network such as a wide area network (WAN), metropolitan area network (MAN), an intranet for a company or other organization, or any other form of network. Location bounded network 204 is a network which exists within a limited geographic area, such as Bluetooth or a local area network (LAN), whether wired or wireless. In some embodiments, server 206 can connect directly to location bounded network 204. In some embodiments, server 206 is consistent with attestation server 100.

In addition to being communicatively coupled to network 202, location bounded network 204 communicatively couples one or more devices (illustrated as mobile device 208 and PC device 210) requesting access to a location based service (or application), and one or more broker devices (illustrated as broker device A 212, broker device B 214, and broker device C 216). While mobile device 208 and PC device 210 are pictured in FIG. 2, more or less devices may be present, and other types of devices may be used, including Internet of Things (IoT) devices, mainframes, servers, or devices in cloud computing environments. Broker devices A-C 212-216 are shown and are illustrative of the fact that there may be multiple broker devices present, but there may also be more or less than the three broker devices shown connected to location bounded network 204.

Mobile device 208 and/or PC device 210 can request access to a location based service consistent with embodiments disclosed herein by communicating this request to server 206 through networks 204 and 202. Server 206 can employ the process disclosed herein to perform global attestation of mobile device 208 and/or PC device 210 using one or more of broker devices A-C 212-216 (described in further detail hereinafter with respect to FIG. 4). Server 206 can also employ the process disclosed herein to authenticate one or more of broker devices A-C 212-216 using the other broker devices (described in further detail hereinafter with respect to FIG. 4).

In other embodiments, server 206 may be communicatively coupled to mobile device 208 and/or PC device 210, and one or more of broker devices A-C 212-216 through network 202 in addition to or instead of network 202 and location bounded network 204 being connected. For example, network 202 can be the internet and location bounded network 204 can be a Bluetooth network. In this example, mobile device 208 may be connected to both network 202 (the internet) as well as location bounded network 204 (the Bluetooth network). Communications between server 206 and mobile device 208 in this example would not need to transfer through location bounded network 204, but can pass through network 202 instead. Similarly, one or more of broker devices A-C 212-216 could communicate with server 206 through network 202 without the communications transferring through location bounded network 204. Additionally, in some embodiments, mobile device 208 and/or PC device 210, and one or more of broker devices A-C 212-216 can communicate with each other through network 202.

FIG. 3 depicts a block diagram of an attestation device 300 in accordance with some embodiments of the present disclosure. In some embodiments, attestation device 300 performs operations in accordance with FIG. 4 as described in further detail hereinafter. Attestation device can play the role of a device requesting access to a location based service, such as mobile device 208 or PC device 210, or a broker device, such as broker devices A-C 212-216. The attestation device 300 can include one or more processors 305 (also referred to as CPUs 305 herein), an I/O device interface 110 which can be coupled to one or more I/O devices 112, one or more network interfaces 315, an interconnect (e.g., BUS) 320, a memory 325, and a storage 330.

In some embodiments, each CPU 305 can retrieve and execute programming instructions stored in the memory 325 or storage 330. The interconnect 320 can be used to move data, such as programming instructions, between the CPUs 305, I/O device interface 310, the network interfaces 315, memory 325, and storage 330. The interconnect 320 can be implemented using one or more busses. Memory 325 is generally included to be representative of a random access memory (e.g., static random access memory (SRAM), dynamic random access memory (DRAM), or Flash).

In some embodiments, the memory 325 can be in the form of modules (e.g., dual in-line memory modules). The storage 330 is generally included to be representative of a non-volatile memory, such as a hard disk drive, solid state device (SSD), removable memory cards, optical storage, or flash memory devices. In an alternative embodiment, the storage 330 can be replaced by storage area-network (SAN) devices, the cloud, or other devices connected to the attestation device 300 via the I/O devices 312 or one or more networks 350 via one or more network interfaces 315.

The CPUs 305 can be a single CPU, multiple CPUs, a single CPU having multiple processing cores, or multiple CPUs with one or more of them having multiple processing cores in various embodiments. In some embodiments, a processor 305 can be a digital signal processor (DSP). The CPUs 305 can additionally include one or more memory buffers or caches (not depicted) that provide temporary storage of instructions and data for the CPUs 305. The CPUs 305 can be comprised of one or more circuits configured to perform one or methods consistent with embodiments of the present disclosure.

Storage 330 contains keys 332, key order information 334, and key timing information 336. Keys 332 can be consistent with keys 132 generated and stored within attestation server 100. In some embodiments, keys 332 are a subset of keys 132. In some embodiments, keys 332 are an encrypted form of keys 132. Key order information 334 can be consistent with key order information 134 generated and stored within attestation server 100. Key timing information 336 can be consistent with key timing information 336 generated and stored within attestation server 100.

Storage 330 of attestation device 300 may not contain all of these items in all embodiments. In embodiments where the attestation server sends key order information (such as key order information 134) to the device requesting access and sends the keys (such as keys 132) to a broker device, the device requesting access will acquire the keys from the broker device and send them back to the attestation server. As such, in these embodiments, both keys 332 and key order information 334 will be present in an attestation device 300 playing the role of a device requesting access. On the other hand, if attestation device 300 is performing the role of a broker device, in these embodiments key order information 334 will not be present in attestation device 300.

Alternatively, in embodiments where the attestation server sends key order information (such as key order information 134) to a broker device and sends the keys (such as keys 132) to the device requesting access, the broker device will acquire the keys from the device requesting access and send them back to the attestation server. As such, in these embodiments, the reverse of the above scenario will be true regarding whether attestation device 300 contains both the keys 332 and the key order information 334; namely, attestation device 300 will contain these both if acting as a broker, but if attestation device 300 is acting as a device requesting access, it will contain keys 332, and not key order information 334.

Similarly, in some embodiments, attestation device 300 receives key timing information 336, but in other embodiments, attestation device 300 does not receive key timing information 336. In embodiments where the attestation server sends key timing information (such as key timing information 136) with key order information (such as key order information 134), attestation device 300 will contain key timing information 336 if and only if it is the device receiving the key order information. In embodiments where the attestation server sends key timing information 136 to a second separate broker device (such that four parties are involved), attestation device 300 also will contain key timing information 336 if and only if attestation device 300 contains key order information 334. In embodiments where the key timing information (whether key timing information 136 or key timing information 336) is contained within or accompanies the keys (whether keys 132 or keys 332), attestation device 300 can contain key timing information 336 when acting as a device requesting access or when acting as a broker device receiving the keys.

In some embodiments as discussed above, storage 330 stores keys 332, key order information 334, and key timing information 336. However, in various embodiments, each of keys 332, key order information 334, and key timing information 336 are stored partially in memory 325 and partially in storage 330, or they are stored entirely in memory 325, or they are accessed over one or more networks 350 via one or more network interfaces 315.

In various embodiments, the I/O devices 312 can include an interface capable of presenting information and receiving input. For example, I/O devices 312 can receive input from a user and present information to a user and/or a device interacting with attestation device 300.

Network interfaces 315 can be one or more of an Ethernet interface, a wireless adapter, a Bluetooth adapter, and/or any other form of network interface. In some embodiments, one or more of the networks 350 is consistent with location bounded network 204 as described with respect to FIG. 2 and/or is consistent with network 202 as described with respect to FIG. 2. Networks 350 can connect (via a physical or wireless connection) the attestation device 300 with other networks, a server (e.g., attestation server 100, server 206), and/or one or more devices (e.g., mobile device 208, PC device 210, broker devices A-C 212-216 of FIG. 2) that interact with the attestation device.

Logic modules throughout the attestation device 300—including but not limited to the memory 325, the CPUs 305, and the I/O device interface 310—can communicate failures and changes to one or more components to a hypervisor or operating system (not depicted). The hypervisor or the operating system can allocate the various resources available in the attestation device 300 and track the location of data in memory 325 and of processes assigned to various CPUs 305. In embodiments that combine or rearrange elements, aspects and capabilities of the logic modules can be combined or redistributed. These variations would be apparent to one skilled in the art.

Figure 4:
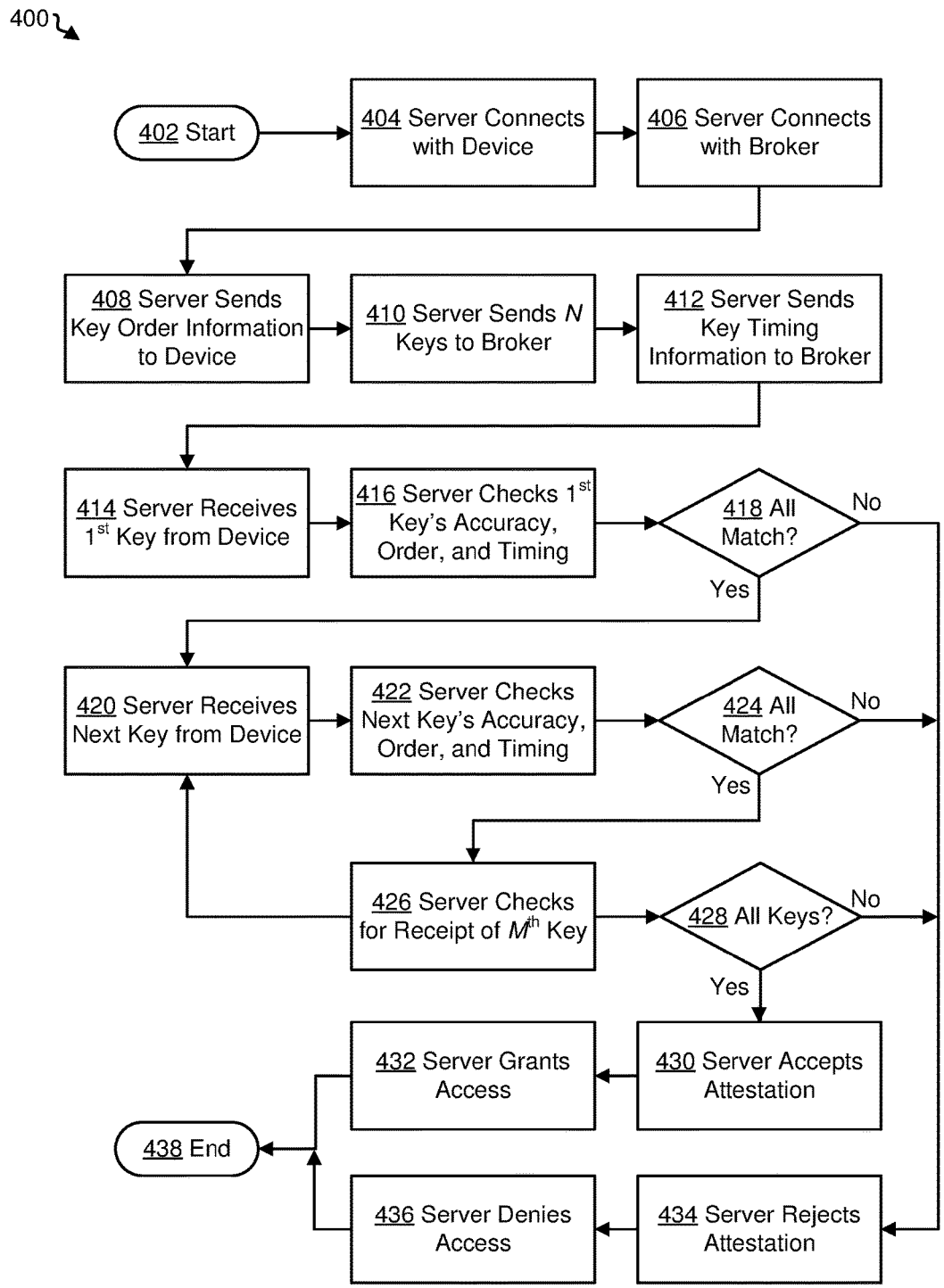
FIG. 4 depicts an example method for secure global attestation using an attestation server, a device requesting access to a location based service, and broker device(s), in accordance with embodiments of the present disclosure.

FIG. 4 depicts an example method 400 for secure global attestation using an attestation server, a device requesting access to a location based service, and broker device(s), in accordance with embodiments of the present disclosure. Method 400 can include more or less actions than those depicted. Method 400 can include actions in different orders than those depicted. Method 400 can be performed by an attestation server (such as attestation server 100 depicted in FIG. 1 or server 206 depicted in FIG. 2) in communication with a device requesting access to a location based service (such as mobile device 208 and/or PC device 210 depicted in FIG. 2 or attestation device 300 depicted in FIG. 3) and in communication with broker device(s) (such as broker devices 212-216 depicted in FIG. 2 or attestation device 300 depicted in FIG. 3). Method 400 can also be performed by an attestation server (such as attestation server 100 depicted in FIG. 1 or server 206 as depicted in FIG. 2) in communication with a broker device (such as broker devices 212-216 depicted in FIG. 2 or attestation device 300 depicted in FIG. 3) seeking authentication as a broker device and in communication with another broker device or device (such as broker devices 212-216 depicted in FIG. 2 or attestation device 300 as depicted in FIG. 3). The remainder of the discussion of method 400 will refer to a device requesting access and broker device(s), but references to a device requesting access could be substituted for a broker device seeking authentication as a broker device throughout.

From start 402, the attestation server connects with the device requesting access at 404. The connection with the device requesting access can take the form of an initial request from the device requesting access, and may also be accompanied by an acknowledgement from the attestation server. Some examples of initial requests to location based services include requests to "check-in" at various locations (e.g., restaurants, coffee shops, stores, concerts, and other places or events), requests to access mapping and navigation applications, and requests to use an application that offers incentives and discounts based on a user's location.

Such initial requests could be sent by a device requesting access directly to a location based service, which the location based service forwards to the attestation server for attestation, or could be sent directly to the attestation server. In some embodiments, the device requesting access may be requesting access to the location based service in response to a solicitation or other prompt beginning with the location based service or the attestation server rather than with the device requesting access.

The establishment of a connection with the device requesting access at 404 could also involve more exchanges of information. For example, the attestation server can request user and password credentials from the device requesting access, the device requesting access can send its location information to the attestation server, and/or the device requesting access can send information regarding the other devices on a location bounded network that the device requesting access is connected to.

At 406, the server connects with one or more broker devices. The attestation server can select one or more broker devices which are connected to a location bounded network to which the device requesting access is connected. The establishment of a connection with a broker device can include a request by the attestation server to the broker device to serve as a broker device for this attestation and can include a response from the broker device that it will. The establishment of a connection with one or more broker devices at 406 could also involve more exchanges of information. For example, the attestation server can request credentials from a broker device, the broker device can send its location information to the attestation server, and/or the broker device can send information regarding the other devices on a location bounded network that the broker device is connected to.

Additionally, at either 404 or 406, the attestation server and either the device requesting access or a broker device could share a session key for encryption of future exchanges of information. Use of a session key could further ensure security during the exchanges of keys, key order information, and/or key timing information to hamper malicious parties from tampering with the process. In some embodiments, the attestation server can encrypt any or all of keys, key order information, and/or key timing information before sending them to their respective locations.

At 408, the attestation server sends the key order information to the device requesting access. As discussed above, in other embodiments, this information can be sent to the broker device or multiple broker devices instead. If sent to multiple broker devices, the attestation server may send all of the key order information to multiple broker devices, or, in the case where the key order information is a listing of keys in order, may send portions of the listing to multiple broker devices. Accompanying this key order information could be a request from the attestation server that the device requesting access send the keys in the order specified by the key order information. Such a request could also occur as part of another operation of method 400 or could be left implied by the sending of the key order information. Additionally, in some embodiments, the attestation server could send the device requesting access information regarding the broker device(s) to retrieve the keys from. In other embodiments, the attestation server may withhold this information and send information to the broker device(s) regarding the device requesting access instead. In embodiments where the device requesting access has sent information to the attestation server regarding other devices on a location bounded network that the device requesting access is connected to, the device requesting access may use this information to identify potential broker devices with the keys. At least one of the parties should have sufficient information allowing the device requesting access and the broker device(s) to identify the other party or parties to complete the method.

At 410, the attestation server sends a set of N keys (where N is the number of keys and can vary in embodiments) to one or more broker devices, which the attestation server connected to in 406. As discussed above, in other embodiments, this information can be sent to the device requesting access instead, if the key order information is sent to the broker device(s) such that the attestation server sends to each device either the key order information or the keys, but not both. The remainder of the discussion of method 400 will refer to the roles as assigned, not the alternate embodiments, but in the case of such alternate embodiments the roles throughout the remainder of the method would similarly be switched. The number N of keys must be greater than or equal to 2, because if only one key were sent, there would be only 1 order in which it could be returned to the attestation server. The greater the number of keys, the more secure the attestation procedure becomes due to the increasing number of possible order combinations. With each additional key however, the greater the increase in time required for the information to flow between all parties involved and reach a conclusion to the request for access. The balance between security and time involved will vary in embodiments. The attestation server may send all N keys to one broker device, may send all N keys to multiple broker devices, or may send portions of the N keys to multiple broker devices. In some embodiments, the attestation server can send instructions to the broker device(s) that the broker device(s) should forward these keys to the device requesting access. Upon receipt of the keys, a broker device may sign and/or encrypt the keys using a public cryptographic key, which could alter the MAC timestamp of the keys, and in some embodiments the key timing information may depend on this timestamp, as discussed above.

At 412, the attestation server sends the key timing information to one or more broker devices, which the attestation server connected to in 406. Operation 412 will only be employed in embodiments where the attestation server requires the keys be sent at particular times or during particular time windows. In embodiments without such a requirement, this operation can be skipped or omitted, as can further references to key timing and key timing information in method 400. In embodiments where the key timing information is sent to more than one broker device, copies can be sent to each device or the key timing information can be separated into smaller portions and sent to multiple brokers. As discussed above, this information may be contained within or attached to each key, and in such case, operations 410 and 412 will be combined. In other embodiments, this information may be sent separately. In still other embodiments, this information may be sent to separate broker(s) from the broker(s) receiving the keys, or this information may be sent to the device requesting access. In some embodiments, the attestation server can send instructions to the broker device(s) that the broker device(s) should forward this key timing information to the device requesting access.

After the attestation server sends the N keys to the broker(s), the device requesting access receives the N keys from the broker device(s). This can occur upon initiation by either or both the device requesting access and the broker device(s) and can depend upon which party or parties have instructions to send or request the keys. In embodiments employing key timing information, where the attestation server sent the key timing information to broker device(s), and where the key timing information is separate from the keys, the device requesting access should also receive, separately or together, the key timing information from the broker device(s).

After the device requesting access has received the keys, the key order information, and (if appropriate) the key timing information, the attestation server receives the first key from the device requesting access at 414. In order for successful attestation, the device requesting access selects this first key based upon the key order information and in embodiments employing key timing, the device sends this first key at a time in accordance with the key timing information. The device requesting access can compile a set of keys to send to the attestation server in order based upon the received keys, key order information, and (if appropriate) key timing information, before sending the first key. In embodiments using encryption with a session key, the device requesting access can decrypt the keys before determining their proper order (and timing in embodiments where timing information is used). In some embodiments, the device requesting access can encrypt the keys before sending them back to the attestation server.

In response to receiving the first key, the attestation server checks the first key at 416. In embodiments where the broker device(s) signed or encrypted the keys with a public key, the attestation server will decrypt the first key using the public key before checking the first key. In embodiments where the attestation server shared a session key for encryption of communications with the device requesting access and the device requesting access encrypted the first key before sending it to the attestation server, the attestation server can decrypt the first key using the session key before checking the first key. The attestation server checks the first key for accuracy, meaning that it is one of the valid keys sent by the attestation server for this attestation procedure. The attestation server also checks the key's order, to verify that the first key sent is supposed to be the first key received using the key order information. Additionally, in embodiments employing key timing, the attestation server checks whether the first key was received (or in some embodiments, sent) at the proper time or in the proper time window. These checks can occur by comparing the received first key with an expected first key or the first in an expected set of keys that the attestation server expects to receive based on the keys, key order information, and (if appropriate) key timing information it sent and determining if the first key matches the expected.

At 418, the attestation server determines if the first key passes all of the required checks for accuracy, order, and timing. If any of the required checks are not passed, method 400 proceeds to operation 434 and the server rejects the attestation. Upon rejection of attestation, access to the location based service is denied at 436. The device requesting access may be notified of this rejection and/or denial through varying means and this notification may be communicated or outputted to the user, administrator, or other person, or stored in a log or other repository of notifications. Additionally, the broker device(s) and/or location based service could be similarly notified. The attestation server and/or the location based service may also log or track the device requesting access's unsuccessful attestation for future use. In other embodiments, the device requesting access will not receive any such notification and will be unable to proceed with its request for access. After denial of access at 436, method 400 ends at 438.

Referring again to operation 418, if all of the required checks are passed, method 400 proceeds to operation 420. In some embodiments, the attestation server can send a notification to the device requesting access that the first key passed the required checks before method 400 proceeds to operation 420. At 420, the attestation server receives the next key from the device requesting access. This process will occur similarly to the sending of the first key at 414. In some embodiments, the attestation server can receive the next key before the attestation server checks the first key. In some embodiments, the attestation server can receive all keys before the attestation server checks the first key.

In response to receiving the next key, the attestation server checks the next key at 422. The attestation server's check of the next key proceeds similarly to the check of the first key at 416. At 424, the attestation server determines if the next key passes all of the required checks for accuracy, order, and timing. If any of the required checks are not passed, method 400 proceeds to operation 434 and the server rejects the attestation.

At 426, the attestation server determines whether it has received the $M^{th}$ key (the last key) from the device requesting access. If the attestation server has not received all keys, it returns to operation 420 to receive the next key. Operations 422 and 424 will proceed as before and method 400 will return to 426 again. At some point when method 400 reaches operation 426, the attestation server will have finished receiving keys, and method 400 proceeds to operation 428. In some embodiments, the attestation server can receive a notification or other indication from the device requesting access that it has finished sending the keys.

In embodiments where only two keys are used, the $M^{th}$ key will be the second key and M will equal 2. In other embodiments, M can correspond to a different number. In embodiments where all N keys are sent by the device requesting access, the number M can be equal to the number N. In other embodiments, M can be less than N. This will occur when not all N keys are called for using the key order information. This can occur where the key order information is a list which does not contain one or more of the N keys. This can also occur where the key order information is a first key containing an identifier of a second key (or information about a first key that contains an identifier of a second key), the other keys contain identifiers of subsequent keys, and the progression from the first key, to the second key, etc. to the $M^{th}$ key, leaves out one or more of the N keys because their identifiers are not present in the progression. M can also be less than N when the device requesting access fails to send all N keys.

In other embodiments, M can be greater than N. This will occur when some of the N keys are called for multiple times using the key order information. To prevent infinite loops, M should not be greater than N in embodiments where keys contain identifiers of subsequent keys, unless the key order information contains information which would prevent such an infinite loop, but M can be greater than N in embodiments where the key order information is a list of keys and certain keys are listed multiple times. M can also be greater than N when the device requesting access sends more keys than the number N.

In some embodiments, a subset of the keys is requested along with multiple instances of one or more keys. This may result in M being less than N (despite one or more keys being used more than once), may result in M being equal to N (despite one or more keys not being used), or may result in M being greater than N (despite one or more keys not being used). Other embodiments where M is less than N, M is equal to N, or M is greater than N may be envisioned and used in method 400.

In some embodiments, as part of checking for receipt of the $M^{th}$ key at 426, the attestation server may wait for a predetermined period of time for additional keys to verify that the $M^{th}$ key has been reached or an indication from the device requesting access that it has sent all keys. The attestation server can use the key order information and keys it sent to the device requesting information and the broker device(s), to determine if the number M of keys received corresponds to the number of keys the attestation server expected to receive. At 428, the attestation server determines if it has received all keys. If the attestation server has received the wrong number of keys, whether that is it received not all of the keys expected or it received too many keys, method 400 proceeds to operation 434 and the server rejects the attestation.

If at 428, the attestation server received all the keys it expected to receive, and no extraneous keys, the attestation server accepts attestation at 430. Upon acceptance of attestation, access to the location based service is granted at 432. The device requesting access may be notified of this acceptance and/or grant of access through varying means and this notification may be communicated or outputted to the user, administrator, or other person, or stored in a log or other repository of notifications. Such notification could be a backend process such that a user of the device requesting access does not see the notification. Additionally, the broker device(s) and/or location based service could be similarly notified. The attestation server and/or the location based service may also log or track the device requesting access's successful attestation for future use. In other embodiments, the device requesting access will not receive any such notification and will proceed with accessing the location based service. After the server grants access at 432, method 400 ends at 438.

The present invention can be a system, a method, and/or a computer program product at any possible technical detail level of integration. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network, and/or a wireless network. The network can comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer, or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method for authentication in global attestation, the method comprising:
  receiving, by a server, a request for access to a location based service from a first device;
  establishing, by the server, a connection with the first device;
  establishing, by the server, a connection with a second device, wherein the first device is connected to the second device by a location bounded network;
  establishing, by the server, a connection with a plurality of other devices;
  generating, by the server, a first plurality of keys using random number generation, wherein the first plurality of keys comprises two or more keys, each having respective time window information, wherein the respective time window information is relative to a modification time of the respective key;
  generating, by the server, a key order information using random number generation, using a bias vector and a signature pattern derived from input information from the server, wherein the bias vector is based upon a length of one or more of the keys in the first plurality of keys, wherein the input information is an input sequence from physical keys, and wherein the key order information comprises a first key, instructions that the first key be sent first, and the first key contains identifying information of a second key to be sent after the first key;
  encrypting, by the server using a cryptographic key, the key order information and the first plurality of keys;
  sending, by the server, the cryptographic key to the first device;
  sending, by the server, the key order information to the first device;
  sending, by the server, the first plurality of keys to the second device, wherein each of a subset of the keys in the first plurality of keys contains instructions on which key to send next;
  sending, by the server, a plurality of keys to each of the plurality of other devices, wherein each key in the pluralities of keys has respective time window information, wherein the respective time window information is relative to a modification time of the respective key, and wherein each of a subset of the keys in the pluralities of keys contains instructions on which key to send next;
  receiving, by the server, a second plurality of keys from the first device, wherein the second plurality of keys is an ordered set of keys compiled using the key order information sent to the first device, the first plurality of keys sent to the second device, and the pluralities of keys sent to the plurality of other devices, wherein at least one of the keys of the second plurality of keys corresponds to a key that is not included in the first plurality of keys and corresponds to a key that was sent to at least one of the plurality of other devices, and wherein the second plurality of keys comprises a different number of keys compared to the first plurality of keys;
  determining, by the server, that the second plurality of keys received from the first device matches an expected plurality of keys, including determining a time of receipt of each of the keys in the second plurality of keys is within an expected time window of receipt based on the respective time window information;
  outputting, by the server and to the location based service, a notification indicating a result of the determining that the second plurality of keys matches the expected plurality of keys; and
  granting, by the server, the first device access to the location based service in response to determining that the second plurality of keys matches the expected plurality of keys.

* * * * *